United States Patent [19]
Cowles

[11] 3,987,467
[45] Oct. 19, 1976

[54] PHOTOGRAPHIC FILM IDENTIFICATION SYSTEM

[76] Inventor: David W. Cowles, 10510-7 Larwin Ave., Chatsworth, Calif. 91311

[22] Filed: Apr. 14, 1975

[21] Appl. No.: 567,689

[52] U.S. Cl. .................................. 354/105; 355/40; 354/76
[51] Int. Cl.² ......................................... G03B 17/24
[58] Field of Search .......... 354/105, 106, 107, 108, 354/109, 75, 76, 77, 297; 355/40, 41, 42, 43; 346/107 R

[56] References Cited
UNITED STATES PATENTS

| | | |
|---|---|---|
| 1,084,592 | 1/1914 | Chouinard .......................... 354/105 |
| 1,817,728 | 8/1931 | Armitage ............................ 354/105 |
| 3,797,025 | 3/1974 | Murphy et al. ....................... 355/40 |
| 3,827,070 | 7/1974 | Hoerenz............................. 354/105 |
| 3,827,802 | 8/1974 | Pfeifer ................................ 354/109 |

*Primary Examiner*—L. T. Hix
*Assistant Examiner*—Alan Mathews
*Attorney, Agent, or Firm*—Robert E. Geauque

[57] ABSTRACT

The combination of a light emitting diode array controlled to photograph an identifying code onto a film; and a printer controlled to print the same number on an associated envelope, container or label. The identifying code is automatically changed after each film strip, container set is printed so as to provide a new code for the next operational cycle.

11 Claims, 3 Drawing Figures

PHOTOGRAPHIC FILM IDENTIFICATION SYSTEM

BACKGROUND OF THE INVENTION

This invention relates generally to photographic film identification systems, and more particularly to such systems which use an identifying code to correlate each film strip with an associated envelope or container.

In the film processing trade, the film rolls or cassettes are normally supplied to the processing dealer in containers, eg. envelopes, on which the information identifying the owner of the film is written. In the past, a control number is placed on the envelope or container and the same number is subsequently placed directly on the film when it is first processed in a darkroom. For example, U.S. Pat. No. 1,084,592 discloses an apparatus whereby a number is perforated into the flap of the film envelope and the perforated flap is placed on the glass portion of a printer so that the film processed in the printer will have this number photographed thereon. Similarly, U.S. Pat. No. 1,817,728 deals with a film numbering device in which the control number is photographed on the film from a number previously stamped on film envelopes; and U.S. Pat. No. 2,315,987 discloses a system whereby a stencil is used to photograph the number on the film.

The prior art approaches to film identification have usually required a considerable amount of manual activity with its inherent drawbacks in processing speed, economy and accuracy.

SUMMARY OF THE INVENTION

A primary object of the subject invention is to provide a film identification system which exhibits improved processing speed, economy and accuracy.

Another object of the invention is to provide an automatic identification system which is adapted for integration into existing film processing arrangements.

A more specific object of the invention is to provide an improved film identification system which automatically generates and applies a unique identifying code to each film strip and its associated container, envelope or label.

In accordance with one embodiment of the invention, a code programer, in conjunction with a keyboard unit, generates a film identification code, eg. a five digit number, and applies the code number to a light emitting diode (LED) array assembly and to a printer. The LED assembly is disposed along the processing path of the film strip and in response to a sensor which senses the lead segment, for example, of the film, the LED assembly is activated and the identification code is photographed onto a film. Concurrently with the photographing of the identification code on the film a remotely located printer is controlled so as to cause the identification code to be imprinted on control item, eg. an envelope or label, associated with the film strip. The identifying code is automatically changed after each operating cycle and the keyboard unit allows any desired code number to be programmed at the start of a series of processing cycles. For example, for a five part code marking, the first one or two programmed letters, symbols or numbers may identify the day of the week, the date the film was received for processing, the type of film or the retail outlet which sent the film to the processing laboratory or any other coding information. This marking is incremented each operating cycle so that the number portion increases by one for each of the film rolls. Hence, the processed and printed film may be correlated with the envelope in which the film roll or cassette was originally received, and which identifies the owner of the film.

BRIEF DESCRIPTION OF THE DRAWINGS

The novel features of the invention are set forth with particularity in the appended claims; and the invention will be better understood from the following description when read in conjunction with the accompanying drawings in which like reference characters refer to like parts and in which:

DESCRIPTION OF THE PREFERRED EMBODIMENTS

Figure 1:
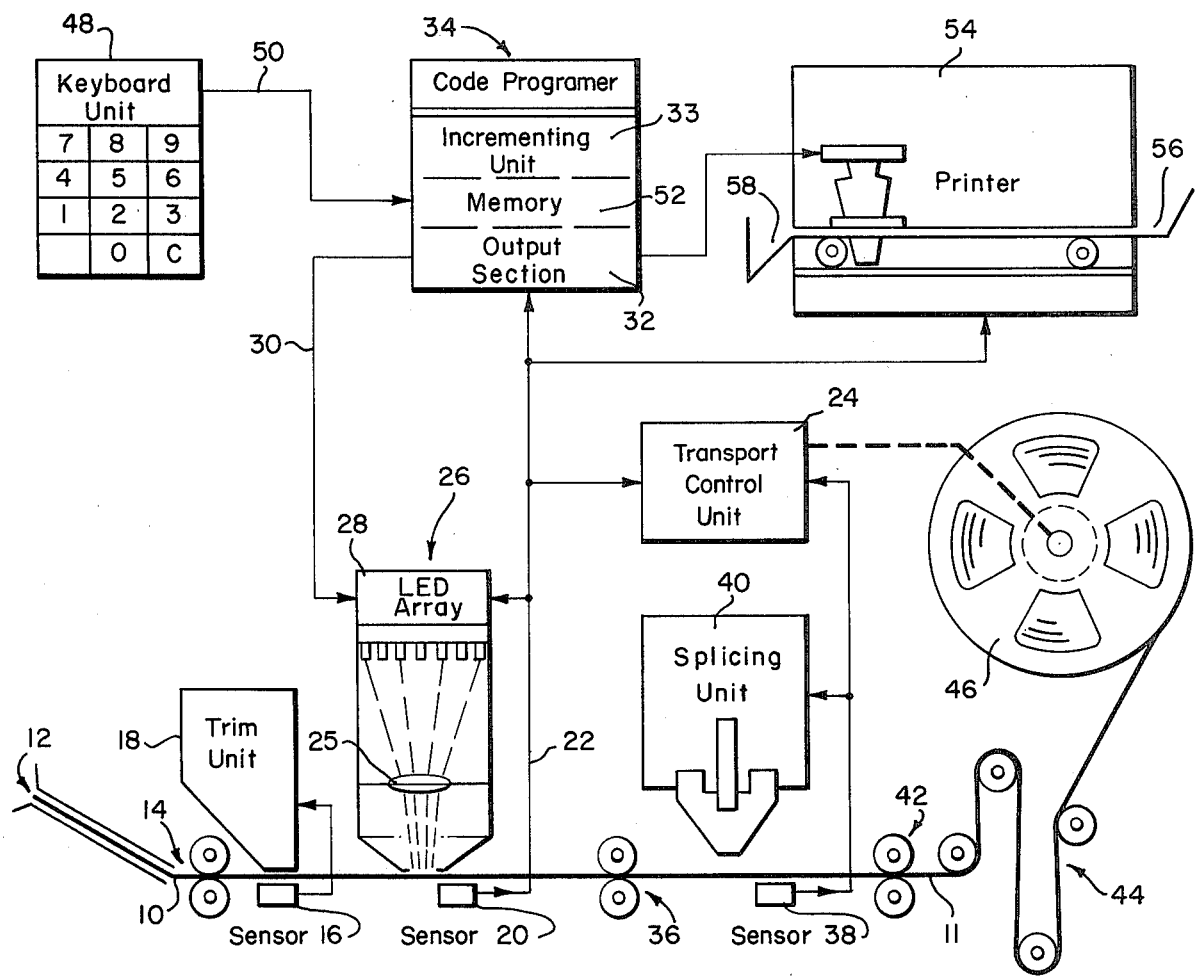
FIG. 1 is a block diagram of one preferred embodiment of a photographic film identification system in accordance with the subject invention.

Referring first to FIG. 1, photographic film strip 10 is supplied through track throat 12, and gripper rollers 14 guide the film past a sensor 16. In response to the film being detected by sensor 16, a trim unit 18 trims the ends of the film. Numerous suitable devices for elements 16 and 18 are known in the art as is their coaction for film trimming.

Next, the film is advanced to sensor 20 which senses the "lead" frame thereof, for example, and in response thereto, provides an output signal on a lead 22. The output signal from sensor 20 is applied to a transport control unit 24 and in response to this signal, the transport control unit momentarily stops the advance of the film to allow time for a LED assembly 26 to photograph an identification code onto the film.

Figure 2:
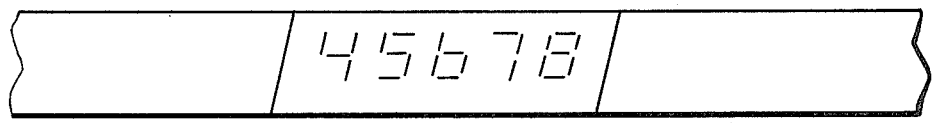
FIG. 2 is an expanded view of the portion of film 10 shown in FIG. 1 on which an identifying code has been exposed.

LED assembly 26 includes an array 28 of light emitting diodes arranged to illuminate a five digit number, for example, in accordance with signals applied thereto on a cable 30 from an output section 32 of a code programmer unit 34. Lens 25 is arranged relative to the light emitting diodes such that the light pattern emitted from the diodes is focused onto film 10. Cable 30 may include seven leads for each digit to be illuminated and for this configuration each digit comprises selected combinations of seven line segments in a manner well known in the electronic display art, (see FIG. 2); and each line segment is formed from about ten light emitting diodes, for example. In response to the signal from sensor 20, LED array 28 is enabled and exposes film 10 with the code number supplied from programmer 34 (See FIG. 2).

After a pause sufficient to allow for the just described photographic operation, transport control unit 24 advances the film through guide rollers 36 to a sensor 38 which senses the "lead" frame and supplies an output signal to transport control unit 24 and to splicing unit 40. In response to the output signal from sensor 38, transport control unit 24 momentarily stops the advance of film 10 and splicing unit 40 connects the lead end of film 10 with the tail end of a preceding film strip 11. Devices suitable for splicing unit 40 are well known in the art, such as for example, those produced by Standard Photo, Inc. of West Springfield, Mass.

Following the splicing operation, the film is advanced through guide rollers 42 and tension rollers 44 to a take-up reel 46. Take-up reel 46 is mechanically driven by transport control unit 24 in a manner well known in the art.

Keyboard unit 48 may be any suitable unit which generates signals indicative of the numbers or letters depressed on the keyboard. These signals are applied on a cable 50 to a memory section 52 of code programmer 34. In the illustrated embodiment, memory section 52 stores the signals programmed by means of the keyboard, and memory 32 is "cleared" in response to a signal produced by the depression of the letter "C" on the keyboard.

Output section 32 of code programmer 34 converts the data stored in memory 52 to the proper format for operating LED array 28 and a printer 54. For example, the data applied to LED array 28 may comprise seven parallel binary bits for each digit of the code number, with each bit controlling one of the seven line segments of each digit of the LED display (see FIG. 2). The data supplied to printer 54 may comprise four parallel binary bits for each bit of the code number; e.g. parallel binary bits 1, 0, 0, 1 would represent $1 + 0 + 0 + 8 = 9$. The printer head in unit 54 may comprise a Victor matrix printing mechanism manufactured by Victor Comptometer Corporation of Chicago, Ill.

In the operation of the system of FIG. 1, the processing path of film 10 is enclosed in a light-free enclosure (not shown), such as a dark room, and keyboard 48, code programmer 34 and printer 54 may be conveniently located outside of the enclosure. As each roll of film is loaded into throat 12 of the system shown in FIG. 1, the control item, eg. the envelope in which the film was received from the retail outlet, is inserted into a bin 56 of printer 54 so that the envelope for the first roll of film to be processed is at the front and the envelopes for rolls of film to be subsequently processed follow. For example, at the start of processing a group of films received, the code 21000 may be programmed, with the digits 21 indicating the twenty-first day of the month and the remaining digits indicating the first film to be processed on that date.

As the first film is fed into throat 12, it is trimmed by unit 18, and in response to signals supplied from sensor 20 the advance of the film is momentarily stopped and LED array 26 photographs the code number "21000" onto the lead frame thereof. Concurrently, the number "21000" is imprinted on the associated envelope as it is automatically processed through printer 54 from input bin 56 to output bin 58. After the first operational cycle, incrementing unit 33 of code programmer 34 adds "1" to the number previously held in memory 52 and stores this new number in the memory so that the second film and its associated envelope are imprinted with the number "21001".

Figure 3:
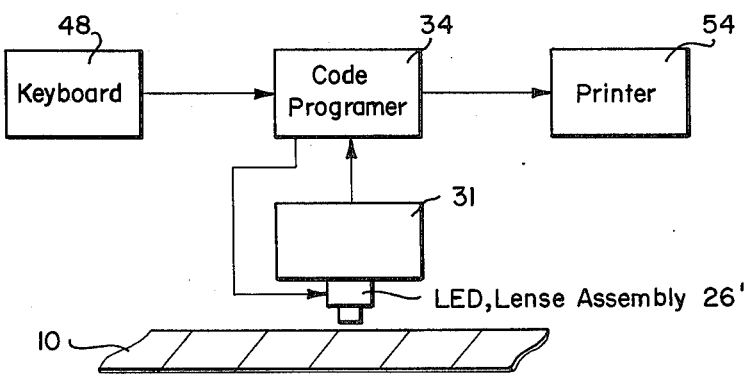
FIG. 3 is a block diagram of a second embodiment of a photographic film identification system in accordance with the subject invention.

The embodiment of FIG. 3 is similar to that described herein above relative to FIG. 1 except that it is adapted for use with rack type film processing in which a plurality of films are disposed in a parallel arrangement on a rack. Unit 31 contains LED assembly 26' and the end or edge of film 10 of each film roll is individually inserted opposite the LED assembly in order to photograph successive code number on the successive rolls. When the film is inserted, a position signal functionally similar to that provided by sensor 20 of FIG. 1 is provided and the operation for identifying the film strips and their associated envelopes is the same as described herein above relative to the embodiment of FIG. 1.

As an alternative means, instead of stopping the film, the film would progress continuously down the track 12. When the sensor 20 is actuated by the film being in a predetermined position, it sends a signal to the code programmer 34 and the programmer 34 enables LED array 28 to intermittently illuminate in such a manner as to reproduce on the film the desired control number.

In place of the LED assembly, it is understood that any other suitable light emitting means can be used to apply the code number to the film, such as a fiber optic dot array or other suitable illuminated displaying means, and the code number can be applied to the film with or without the use of light projecting means associated with the light emitting means depending upon the type of illuminating display utilized. It is also understood that while reference has been made to a five digit marking, the marking can be any number of digits and can include symbols and letters as well as numerals.

What is claimed is:

1. A system for providing identification of photographic film with respect to an associated control item, said system comprising:
    light emitting means for producing a light pattern in response to applied data signals and for applying said light pattern onto the film;
    a printer responsive to applied data signals for marking a code onto the associated control item;
    code programmer means for generating said data signals and for applying them to said light emitting means and to said printer so that a preselected correlation exists between the light pattern applied onto the film and the code marked onto the control item; and
    means responsive to film position for producing a film position signal which activates said light emitting means and said printer.

2. The system of claim 1 wherein said light emitting means comprises light projection means including an array of light emitting diodes and focusing means arranged therewith so as to project light patterns onto the film.

3. The system of claim 1 further comprising a keyboard unit, and wherein said code programmer means includes means for generating said data signals as a function of output signals from said keyboard.

4. The system of claim 1 further comprising means for transporting successive films applied to the system along a preselected path and said film position signal producing means being responsive to each successive film to provide a film position signal for each film being transported.

5. The system of claim 4 wherein said code programmer means includes means for applying data signals representative of a code which includes at least one identifying mark to said light emitting means and to said printer, and means for incrementing said mark by one following each activation of said light emitting means and said printer, said incrementing means being controled in response to each said successive film position signal.

6. The system of claim 4 further comprising means for sensing the presence of film on said preselected path and for splicing together the lead and tail segments of film strips which are consecutively fed to said system, whereby a continuous strip of the applied films is produced.

7. The system of claim 4 further comprising means for sensing the presence of film on said preselected path and means responsive to said sensing means for trimming the end of said film.

8. A system for automatically exposing a film and marking an associated control item such that the correlation therebetween is established, said system comprising:
film transport means for transporting film applied thereto along a preselected path;
projection means, responsive to first electrical signals, for projecting a light pattern representative of a film identifying code onto a segment of each film transported along said path;
printing means, responsive to second electrical signals, for receiving the control item associated with each film supplied to said film transport means and for imprinting an identifying code thereon; and
code programmer means, coupled to said code projection means and to said printing means, for supplying said first and second electrical signals to said projection means and to said printing means, respectively, so as to cause a unique code to be imprinted on each film and so as to cause the identifying code imprinted on said control item to have a preselected correspondence to the film identifying code.

9. The system of claim 8 wherein said projection means includes an array of light emitting diodes and means for focusing the light generated by the light emitting diodes onto the film.

10. The system of claim 8 wherein said control item is a film container and said code programmer means includes means for applying signals representative of a code that includes at least one digit to said projection means and to said printer, and means for incrementing said digit by one following each application of signals to said projection means and to said printer.

11. The system of claim 8 further comprising a keyboard unit, and wherein said programmer means includes means for generating said code signals as a function of output signals from said keyboard unit.

* * * * *

REEXAMINATION CERTIFICATE (455th)
United States Patent [19]
Cowles

[11] B1 3,987,467
[45] Certificate Issued  Feb. 11, 1986

[54] PHOTOGRAPHIC FILM IDENTIFICATION SYSTEM

[76] Inventor: David W. Cowles, 10510-7 Larwin Ave., Chatsworth, Calif. 91311

Reexamination Request:
No. 90/000,571, Jun. 8, 1984

Reexamination Certificate for:
Patent No.: 3,987,467
Issued: Oct. 19, 1976
Appl. No.: 567,689
Filed: Apr. 14, 1975

[51] Int. Cl.[4] .................. G03B 17/24; G03D 15/04; B31F 5/00
[52] U.S. Cl. .................. 354/105; 156/505; 354/76; 355/40
[58] Field of Search ............. 354/75, 76, 77, 105, 354/106, 107, 108, 109, 297; 355/40, 41, 42, 43; 346/107 R; 156/159, 304.1, 505, 506, 545

[56] References Cited
U.S. PATENT DOCUMENTS
3,689,155  9/1972  Nishiyama et al.
3,779,837  12/1973  Zahn et al.
3,827,070  7/1974  Hoerenz et al. ............... 354/105
3,961,161  6/1976  Ueda et al.

FOREIGN PATENT DOCUMENTS
982311  10/1974  Italy.

OTHER PUBLICATIONS
"The CX 110 Daylight Auto Splicer" Brochure, Apr. 1973.
"CX 110 Daylight Auto Splicer" *Photo Marketing* Magazine, p. 20, Aug. 1973.

*Primary Examiner*—Alan Mathews

[57] ABSTRACT

The combination of a light emitting diode array controlled to photograph an identifying code onto a film; and a printer controlled to print the same number on an associated envelope, container or label. The identifying code is automatically changed after each film strip, container set is printed so as to provide a new code for the next operational cycle.

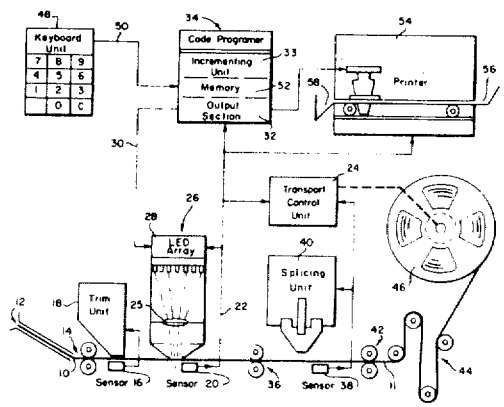

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 8 are determined to be patentable as amended.

Claims 2–7 and 9–11, dependent on an amended claim, are determined to be patentable.

1. A system for providing identification of photographic film with respect to an associated control item, said system comprising:
   light emitting means for producing a light pattern in response to applied data signals and for applying said light pattern onto the film;
   a printer responsive to applied data signals for marking a code onto the associated control item;
   code programmer means for generating said data signals and for applying them to said light emitting means and to said printer so that a preselected correlation exists between the light pattern applied onto the film and the code marked onto the control item; and
   means responsive to film position for producing a film position signal which activates said light emitting means and said printer [.];
   *said data signals being representations of a code to be imprinted on said control item and on said film.*

8. A system for automatically exposing a film and marking an associated control item such that the correlation therebetween is established, said system comprising:
   film transport means for transporting film applied thereto along a preselected path;
   projection means, responsive to first electrical signals, for projecting a light pattern representative of a film identifying code onto a segment of each film transported along said path;
   printing means, responsive to second electrical signals, for receiving the control item associated with each film supplied to said film transport means and for imprinting an identifying code thereon; and
   code programmer means, coupled to said code projection means and to said printing means, for supplying said first and second electrical signals to said projection means and to said printing means, respectively, so as to cause a unique code to be imprinted on each film and so as to cause the identifying code imprinted on said control item to have a preselected correspondence to the film identifying code [.];
   *both said first and second electrical signals being representations of said unique code imprinted on each film and said identifying code imprinted on said control item.*

* * * * *